(12) United States Patent
Date et al.

(10) Patent No.: US 7,970,375 B2
(45) Date of Patent: Jun. 28, 2011

(54) SYSTEM AND METHOD FOR EXPIRING MODULAR SOFTWARE COMPONENTS FOR WIRELESS COMMUNICATION DEVICES

(75) Inventors: Umesh M. Date, Bangalore (IN); Mehul B. Patel, Bangalore (IN); Gowri S. Rajaram, Oceanside, CA (US)

(73) Assignee: Kyocera Corporation, Kyoto (JP)

( * ) Notice: Subject to any disclaimer, the term of this patent is extended or adjusted under 35 U.S.C. 154(b) by 844 days.

(21) Appl. No.: 11/679,146

(22) Filed: Feb. 26, 2007

(65) Prior Publication Data
US 2007/0143749 A1  Jun. 21, 2007

Related U.S. Application Data

(60) Division of application No. 10/848,940, filed on May 18, 2004, now Pat. No. 7,184,759, which is a continuation-in-part of application No. 10/665,962, filed on Sep. 18, 2003, now Pat. No. 7,184,793, which is a continuation-in-part of application No. 09/917,026, filed on Jul. 26, 2001, now Pat. No. 7,328,007, and a continuation-in-part of application No. 09/916,900, filed on Jul. 26, 2001, now Pat. No. 7,027,806, and a continuation-in-part of application No. 09/916,460, filed on Jul. 26, 2001, now Pat. No. 7,159,214.

(51) Int. Cl.
*H04M 15/00* (2006.01)

(52) U.S. Cl. ............................ 455/405; 455/418; 705/59

(58) Field of Classification Search ........................ None
See application file for complete search history.

(56) References Cited

U.S. PATENT DOCUMENTS 5,046,082 A  9/1991  Zicker et al.
(Continued)

FOREIGN PATENT DOCUMENTS
DE  19502728  8/1996
(Continued)

OTHER PUBLICATIONS

Guiagoussou et al., "Implementation of a Diagnostic and Troubleshooting Multi-Agent System for Cellular Networks", Int'l J Network Mgmnt., pp. 221-237, Aug. 1999.

*Primary Examiner* — Phuoc Doan

(57) ABSTRACT

A system and method for expiring a software module on a wireless communication device is disclosed. According to one embodiment, the method comprises receiving, at the wireless communication device, an expiration notice for the software module and determining if license renewal of the software module is automatic. If the license renewal is not automatic, then the method includes notifying a user of the wireless communication device of the receipt of the expiration notice, and de-activating the software module upon receipt of instructions to not renew. In certain embodiments, the software module is de-activated after an expiration of a trial period if no instructions are received from the user in response to the notifying step. The method may further include sending the renewal instructions to the software module server upon receipt of instructions to renew, receiving an activation key from the software module server in response to sending the renewal instructions, and activating the software module utilizing the activation key. If the license renewal is automatic or receipt of instructions to renew are received, then the method includes sending the renewal instructions to the software module server, receiving an activation key from the software module server, and activating the software module utilizing the activation key.

8 Claims, 5 Drawing Sheets

U.S. PATENT DOCUMENTS

| | | | |
|---|---|---|---|
| 5,337,255 A | 8/1994 | Seidel et al. |
| 5,400,389 A | 3/1995 | Niiyama et al. |
| 5,481,706 A | 1/1996 | Peek |
| 5,507,009 A | 4/1996 | Grube et al. |
| 5,600,823 A | 2/1997 | Sherer et al. |
| 5,673,317 A | 9/1997 | Cooper |
| 5,699,275 A | 12/1997 | Beasley et al. |
| 5,715,462 A | 2/1998 | Iwamoto et al. |
| 5,734,904 A | 3/1998 | Kanamori et al. |
| 5,771,386 A | 6/1998 | Baumbauer |
| 5,784,537 A | 7/1998 | Suzuki et al. |
| 5,790,704 A | 8/1998 | Rao et al. |
| 5,790,856 A | 8/1998 | Lillich |
| 5,832,086 A | 11/1998 | Rosauer |
| 5,835,778 A | 11/1998 | Yoshihara |
| 5,875,242 A | 2/1999 | Glaser et al. |
| 5,920,826 A | 7/1999 | Metso et al. |
| 5,930,704 A | 7/1999 | Kay |
| 5,938,766 A | 8/1999 | Anderson et al. |
| 5,960,356 A | 9/1999 | Alperovich et al. |
| 5,974,312 A | 10/1999 | Hayes et al. |
| 6,018,543 A | 1/2000 | Blois et al. |
| 6,023,620 A | 2/2000 | Hansson |
| 6,026,400 A | 2/2000 | Suzuki |
| 6,047,071 A | 4/2000 | Shah |
| 6,138,009 A | 10/2000 | Birgerson |
| 6,138,153 A | 10/2000 | Collins, III et al. |
| 6,145,098 A | 11/2000 | Nouri et al. |
| 6,195,546 B1 | 2/2001 | Leung et al. |
| 6,247,065 B1 | 6/2001 | Greenspan et al. |
| 6,272,333 B1 | 8/2001 | Smith |
| 6,275,694 B1 | 8/2001 | Yoshida et al. |
| 6,308,061 B1 | 10/2001 | Criss et al. |
| 6,351,636 B2 | 2/2002 | Shaffer et al. |
| 6,415,266 B1 | 7/2002 | Do |
| 6,442,660 B1 | 8/2002 | Henerlau et al. |
| 6,449,476 B1 | 9/2002 | Hutchison, IV et al. |
| 6,457,174 B1 | 9/2002 | Kuroda et al. |
| 6,460,070 B1 | 10/2002 | Turek et al. |
| 6,470,447 B1 | 10/2002 | Lambert et al. |
| 6,493,549 B1 | 12/2002 | Axelson et al. |
| 6,493,871 B1 | 12/2002 | McGuire et al. |
| 6,498,789 B1 | 12/2002 | Honda |
| 6,546,492 B1 | 4/2003 | Walker et al. |
| 6,549,770 B1 | 4/2003 | Marran |
| 6,578,056 B1 | 6/2003 | Lamburt |
| 6,578,142 B1 | 6/2003 | Anderson et al. |
| 6,622,017 B1 | 9/2003 | Hoffman |
| 6,633,759 B1 | 10/2003 | Kobayashi |
| 6,643,506 B1 | 11/2003 | Criss et al. |
| 6,714,992 B1 | 3/2004 | Kanojia et al. |
| 6,731,946 B1 | 5/2004 | Stanwood et al. |
| 6,754,894 B1 | 6/2004 | Costello et al. |
| 6,754,895 B1 | 6/2004 | Bartel et al. |
| 6,763,252 B2 | 7/2004 | Itazawa |
| 6,785,541 B2 | 8/2004 | Martin |
| 6,950,847 B2 | 9/2005 | Harrisville-Wolff et al. |
| 6,959,192 B1 | 10/2005 | Cannon et al. |
| 6,990,660 B2 | 1/2006 | Moshir et al. |
| 7,065,347 B1 | 6/2006 | Vikse et al. |
| 2001/0000538 A1 | 4/2001 | Kowaguchi |
| 2001/0005861 A1 | 6/2001 | Mousseau et al. |
| 2001/0019953 A1 | 9/2001 | Furukawa et al. |
| 2001/0027500 A1 | 10/2001 | Matsunaga |
| 2001/0051519 A1 | 12/2001 | Shirai |
| 2001/0054161 A1 | 12/2001 | Wooddruff |
| 2002/0019973 A1 | 2/2002 | Hayashida |
| 2002/0026634 A1 | 2/2002 | Shaw |
| 2002/0065041 A1 | 5/2002 | Lunsford et al. |
| 2002/0072359 A1 | 6/2002 | Moles et al. |
| 2002/0077077 A1 | 6/2002 | Rezvani et al. |
| 2002/0083142 A1 | 6/2002 | Lagosanto et al. |
| 2002/0083143 A1 | 6/2002 | Cheng |
| 2002/0107809 A1* | 8/2002 | Biddle et al. .................... 705/59 |
| 2002/0131397 A1 | 9/2002 | Patel et al. |
| 2002/0142762 A1 | 10/2002 | Chmaytelli et al. |
| 2002/0152268 A1 | 10/2002 | Kureshy et al. |
| 2002/0152395 A1* | 10/2002 | Zhang et al. ................. 713/200 |
| 2002/0160763 A1 | 10/2002 | Mittal et al. |
| 2002/0161796 A1 | 10/2002 | Sylthe |
| 2002/0170039 A1 | 11/2002 | Kovacevic |
| 2003/0014561 A1 | 1/2003 | Cooper |
| 2003/0060189 A1 | 3/2003 | Minear et al. |
| 2003/0195013 A1 | 10/2003 | Zicker et al. |
| 2004/0158829 A1 | 8/2004 | Beresin et al. |
| 2004/0177072 A1 | 9/2004 | Salminen et al. |
| 2004/0203768 A1 | 10/2004 | Ylitalo et al. |
| 2004/0214551 A1 | 10/2004 | Kim |
| 2004/0229644 A1 | 11/2004 | Heie et al. |
| 2004/0240657 A1 | 12/2004 | Camarillo |
| 2004/0249657 A1 | 12/2004 | Kol et al. |
| 2004/0249768 A1 | 12/2004 | Kontio et al. |
| 2004/0266422 A1 | 12/2004 | Hotze et al. |
| 2005/0064847 A1 | 3/2005 | Kirbas et al. |
| 2005/0079863 A1 | 4/2005 | Macaluso |
| 2005/0209930 A1 | 9/2005 | Coppinger et al. |

FOREIGN PATENT DOCUMENTS

| | | |
|---|---|---|
| DE | 19543843 | 5/1997 |
| DE | 19850133 | 5/1999 |
| EP | 0459344 | 12/1991 |
| EP | 0889405 | 1/1999 |
| EP | 0918420 | 5/1999 |
| EP | 1014263 | 6/2000 |
| FR | 2800963 | 5/2001 |
| GB | 2227584 | 8/1990 |
| GB | 2349485 | 11/2000 |
| WO | WO 9300633 | 1/1993 |
| WO | WO 98/09208 | 3/1998 |
| WO | WO 9922325 | 5/1999 |
| WO | WO 00/67112 A | 11/2000 |
| WO | WO 0073912 | 12/2000 |
| WO | WO 0074412 | 12/2000 |
| WO | WO 0135686 | 5/2001 |
| WO | WO 02058364 | 7/2002 |

* cited by examiner

SYSTEM AND METHOD FOR EXPIRING MODULAR SOFTWARE COMPONENTS FOR WIRELESS COMMUNICATION DEVICES

RELATED APPLICATIONS

This application is a divisional of application Ser. No. 10/848,940, filed on May 18, 2004, now U.S. Pat. No. 7,184,759 which is a continuation in part application of application Ser. No. 10/665,962, filed on Sep. 18, 2003, now U.S. Pat. No. 7,184,793 which is a continuation in part of application Ser. No. 09/917,026, filed on Jul. 26, 2001, now U.S. Pat. No. 7,328,007 of application Ser. No. 09/916,900, filed on Jul. 26, 2001, now U.S. Pat. No. 7,027,806 and of application Ser. No. 09/916,460, filed on Jul. 26, 2001, now U.S. Pat. No. 7,159,214 which are hereby incorporated by reference.

FIELD OF THE INVENTION

The present invention generally relates to the field of wireless communications and more particularly relates to interchangeable software applications and components of the operating system in a wireless communication device.

BACKGROUND OF THE INVENTION

Conventional wireless communication devices typically become isolated computing platforms once they are deployed (i.e., sold to a consumer). Consumers typically must bring the wireless communication device (also referred to herein as "wireless device," "handset," and "mobile device") to a service station for upgrades to the operating system or any integral software application such as a phonebook.

Additionally, if the consumer wants to replace a hardware component of a wireless communication device, the wireless device must be brought into a service station. Generally, hardware replacements are prohibitively expensive if the wireless device is not broken and under warranty. Even so, when a wireless device under warranty has a hardware component replaced, the new component is merely a working version of the component being replaced. Thus, when a consumer purchases a wireless communication device, the consumer is locked into the physical configuration of the wireless device for the life of the wireless communication device.

An additional drawback of conventional wireless communication devices is that new external devices, such as a digital cameras, are limited to the specific, proprietary device that is offered by the manufacturer of the handset. Thus, a consumer's choice of external devices that enhance a wireless communication device is severely limited. Therefore, what is needed is a system and method that overcomes these significant problems found in the conventional systems as described above.

SUMMARY OF THE INVENTION

Conventional wireless communication devices are isolated computing platforms. Once a wireless communication device has been deployed, updates to the software on the device require that the handset be brought into a service station where the software suit can be upgraded and the handset reconfigured. This is particularly true where updates to the operating system are involved or integral applications such as the address book. Additionally, the software suite on a deployed handset is static and inflexible and does not allow a user to customize the various applications to suit his or her needs.

The present invention provides systems and methods for dynamic installation of modular software applications and operating system components. When a handset is instructed to install a new software module, the handset sends a request to a software module server identifying the new application or software module to be installed. The software module server responds with an instruction set for installing the software module and the software module itself. Upon receipt, the handset installs the software module, making any necessary deletions to applications or modules in persistent storage on the handset. Finally, the handset can be reconfigured or rebooted to complete the installation and configuration.

A system and method for expiring a software module on a wireless communication device is also disclosed. According to one embodiment, the method comprises receiving, at the wireless communication device, an expiration notice for the software module and determining if license renewal of the software module is automatic. If the license renewal is not automatic, then the method includes notifying a user of the wireless communication device of the receipt of the expiration notice, and de-activating the software module upon receipt of instructions to not renew. In certain embodiments, the software module is de-activated after an expiration of a trial period if no instructions are received from the user in response to the notifying step. The method may further include sending the renewal instructions to the software module server upon receipt of instructions to renew, receiving an activation key from the software module server in response to sending the renewal instructions, and activating the software module utilizing the activation key. If the license renewal is automatic or receipt of instructions to renew are received, then the method includes sending the renewal instructions to the software module server, receiving an activation key from the software module server, and activating the software module utilizing the activation key.

BRIEF DESCRIPTION OF THE DRAWINGS

The details of the present invention, both as to its structure and operation, may be gleaned in part by study of the accompanying drawings described below, in which like reference numerals refer to like parts.

DETAILED DESCRIPTION

Disclosed herein are systems and methods for dynamically updating software modules and software applications on a wireless communication device via an over-the-air link. For example, one method as disclosed herein allows for a wireless communication device to request a new software module from a software server and receive that new module in an wireless communication data package. Upon receipt of the data package, the wireless device installs the requested software module and if necessary, deletes other modules to make space for the new module in persistent storage. If necessary, the wireless device also reconfigures the wireless device for use of the new software module and may also initiate a reboot of the device.

After reading this description it will become apparent to one skilled in the art how to implement the invention in various alternative embodiments and alternative applications. However, although various embodiments of the present invention will be described herein, it is understood that these embodiments are presented by way of example only, and are not limitations. As such, this detailed description of various alternative embodiments should not be construed to limit the scope or breadth of the present invention as set forth in the appended claims.

Figure 1:
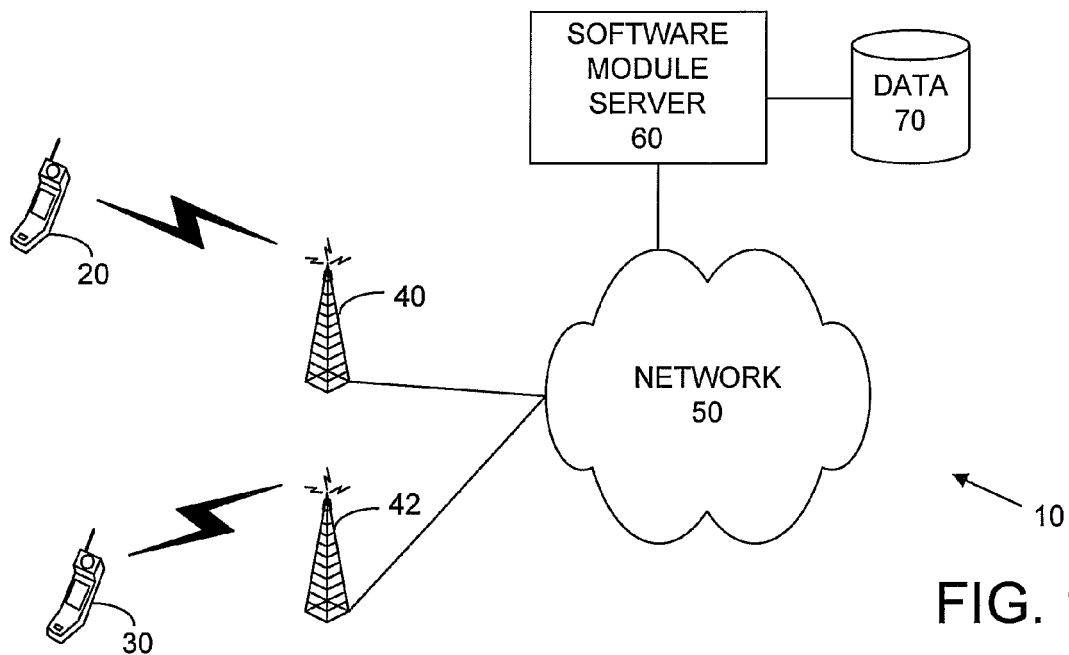
FIG. 1 is a high level block diagram illustrating an example wireless communication network.

FIG. 1 is a high level block diagram illustrating an example wireless communication network 10. In the illustrated embodiment, the wireless communication network 10 comprises a plurality of wireless communication devices 20 and 30 communicatively coupled with a network 50 via a plurality of base stations 40 and 42. Additional wireless communication devices and base stations can also be employed as part of the wireless communication network 10. The wireless communication network 10 also comprises a software module server 60, which is coupled with a data storage area 70. The wireless communication devices 20 and 30 are communicatively coupled with the software module server 60 via the base stations 40 and 42 and the network 50.

Wireless communication device 20 can be any sort of device with the ability to communicate within the wireless communication network 10 and execute software modules. Preferably, wireless communication device 20 also has a persistent storage area. For example, wireless communication device 20 may be a cell phone, a personal digital assistant ("PDA"), a laptop computer, wristwatch, or any other device configured for wireless communication. Wireless communication devices may also be referred to herein as "handsets" or "mobile phones" or "mobile devices."

Base station 40 is configured to communicate over-the-air with a plurality of wireless communication devices and includes a transceiver (not shown) that converts the over-the-air communications to wired communications that travel over network 50. Preferably, network 50 is a private network operated by a wireless carrier which provides the infrastructure for handoffs between base stations such as base station 40 and 42. Additionally, network 50 preferably provides the communication link between various applications, services, and other computer based servers such as software module server 60.

Network 50 may also serve as the conduit for connections to other networks (not pictured) such as an Integrated Services Digital Network ("ISDN"), Public Switched Telephone Network ("PSTN"), Public Land Mobile Network ("PLMN"), Packet Switched Public Data Network ("PSPDN"), and the Internet, just to name a few.

Software module server 60 can be implemented as a single computer or as a plurality of servers logically arranged to provide dynamic instruction sets and software modules to mobile devices and to execute dynamic instruction sets received from mobile devices. In the illustrated embodiment, software module server 60 is coupled with a data storage area 70 that preferably houses a plurality of executable interfaces and a set of server operation codes, handset operation codes and executable instructions corresponding to the server operation codes. The features of a general purpose computer that may implement the software module server 60 are later described with respect to FIG. 11. One function of the software module server 60 is to receive requests from a handset 20, 30 and respond to those requests by providing the handset with an executable software module that the handset can offer for use by a user.

Figure 2:
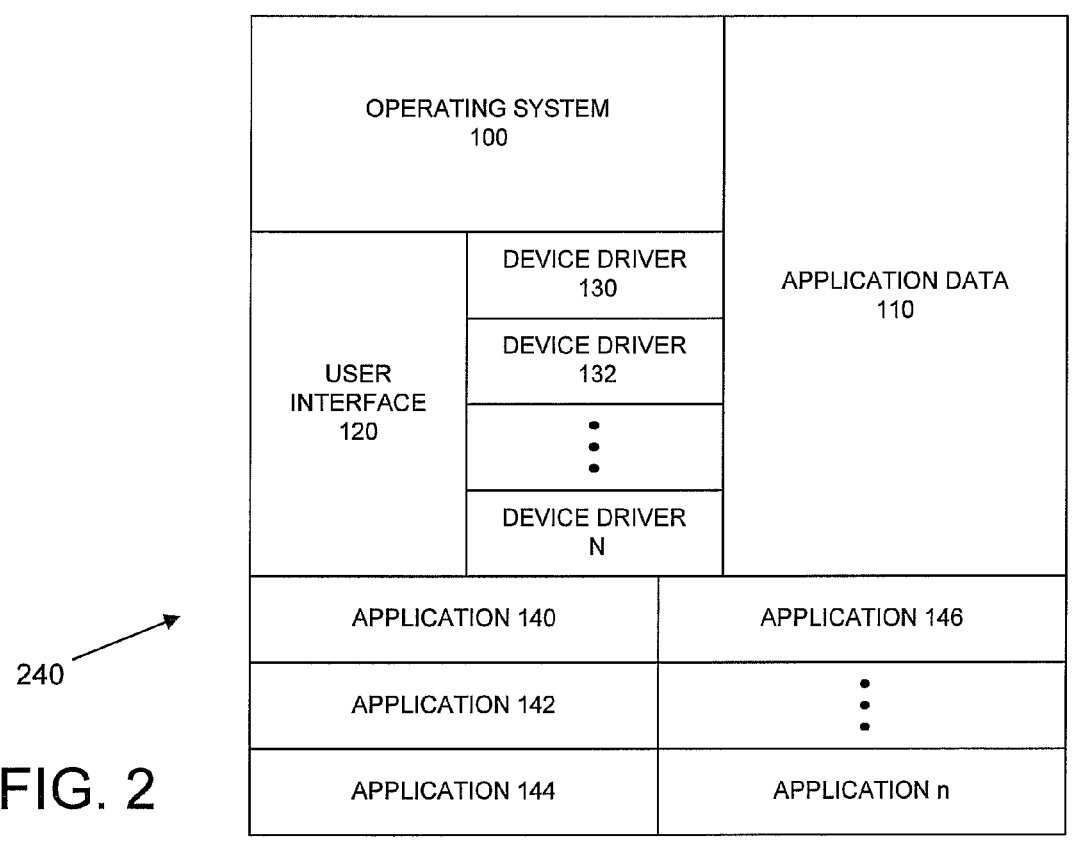
FIG. 2 is a block diagram illustrating an example representation of data in persistent storage on a wireless communication device.

FIG. 2 is a block diagram illustrating an example representation of data in persistent storage 240 on a wireless communication device 20. The general features of wireless communication device 20, 30 that allow it to function as such are later described with respect to FIG. 10. In the illustrated embodiment, the operating system 100 is resident in persistent storage 240. The operating system 100 preferably comprises the fundamental executable program or programs that allow the device to function. In addition to the operating system 100, application data 110 and user interface 120 are in persistent storage 240. The application data 110 preferably comprises the user information and application information that an application needs to function or that an application uses to provide its service.

The user interface 120 may comprise both the executable user interface application and the user interface data that is used by the application. In an alternative embodiment, the user interface application portion may be included as part of the operating system and the user interface 120 may comprise ancillary user data or custom data or other data usable by the user interface application or the user. The persistent storage area 240 additionally comprises one or more device drivers such as device driver 130, device driver 132, all the way up to device driver n. These device drivers are preferably executable applications that facilitate communication between the handset and another device, or possibly between the core handset and an integral device such as the display, keypad, speaker, microphone, or earphones, just to name a few.

Additionally shown as part of the persistent storage 240 are a series of software applications or modules such as applications 140,142,144,146, and on up to application n. As illustrated, a large number of applications may be resident as part of the persistent storage 240. The only limit on the number of applications that can be stored in persistent storage 240 is the physical limit of the storage 240.

Figure 3A:
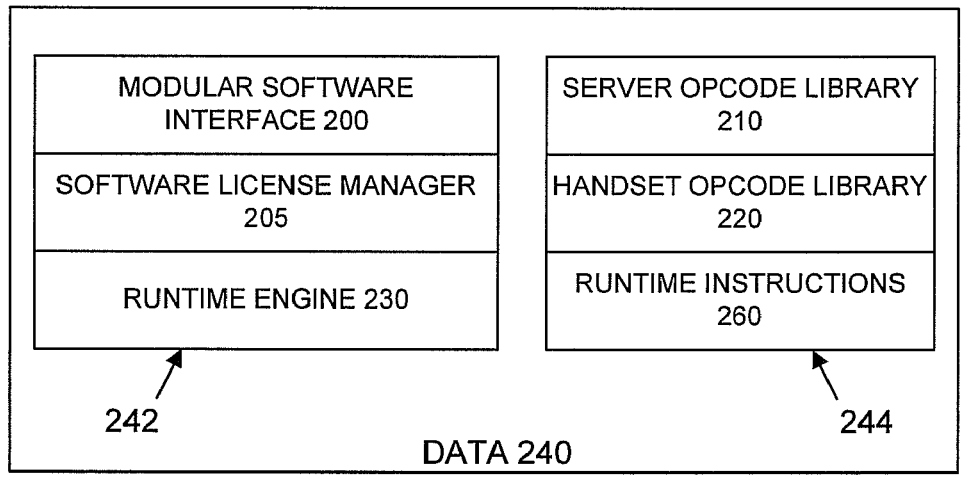
FIG. 3A is a block diagram illustrating components of a data storage area in an example embodiment.

FIG. 3a is a block diagram illustrating elements of data 240 of an example wireless communication device 20. In the illustrated embodiment, the data 240 has a number of applications 242 comprising a modular software interface 200, a software license manager 205, and a runtime engine 230. Other data elements 244, which may be included in the application data 110 as illustrated in FIG. 2, comprise a server operation code ("opcode") library 210, handset opcode library 220, and runtime instructions 260.

The modular software interface 200 is preferably configured to receive user requests to install new software modules and applications. Additionally, the modular software interface 200 is preferably configured to receive network initiated software module downloads and software application downloads. The modular software interface 200 may comprise a user interface module that is adaptable to accept commands from a user for user initiated downloads. Additionally, the modular software interface 200 may comprise a communication module adaptable to receive communications from a network server for network initiated downloads.

In one embodiment, the modular software interface 200 receives a command from a user to download a particular software module. The modular software interface 200 is preferably configured to communicate with the runtime engine 230 to create a request for the software module to be downloaded from a network server. In an alternative embodiment, the modular software interface 200 receives a command that originated from a network server. The modular software interface 200 is preferably configured to parse and interpret the command to determine what software module the network server is requesting that the handset download and install. Upon validation of the request from the network, the modular software interface 200 then proceeds to communicate with the runtime engine 230 to effect the download.

Additionally, the modular software interface 200 can be configured to determine the available space in persistent storage 240 where the software module is to be installed. For example, upon receiving a request to install a new software module, the modular software interface 200 determines the amount of disk space (or other persistent storage space) available on the handset. In one embodiment, to determine the available storage space, the modular software interface 200 may query the operating system 100 of the handset, as discussed above with reference to FIG. 2. If enough space is available, then the modular software interface 200 can proceed to communicate with the runtime engine 230 as described above.

If there is not enough persistent storage space to install the requested software module, the modular software interface 200 queries the user or the network 50 (depending on where the request originated) to identify a software module or other data in persistent storage that can be deleted. Alternatively, the modular software interface 200 may determine what data can be deleted, for example, by querying the operating system or identifying older versions of the requested software module.

Additionally, the modular software interface 200 is preferably configured to instruct the operating system 100 to delete the identified software module or other data in persistent storage 240 in order to provide enough availability for the new software module. If no persistent storage space is available, and none can be obtained by deleting data or software modules already occupying space in persistent storage, then the modular software interface 200 can notify the user or network that space is not available to install the requested software module.

Continuing with FIG. 3A, the handset opcode library 220 preferably includes the universe of operation codes that represent each function or executable code segment that the handset can be instructed to execute by the software module server 60, illustrated in FIG. 1. Advantageously, handset opcode library 220 includes the operation codes that serve as place holders for the actual executable machine code functions or code segments. As such, the handset opcode library 220 preferably contains a list of all available operation codes that correspond to each and every function that can be executed by the handset 20, 30.

Similarly, the server opcode library 210 preferably includes the universe of operation codes that represent each server side function or executable code segment. Advantageously, server opcode library 210 may only include the operation codes for the actual executable machine code functions or code segments, which do not reside on the wireless communication device 20. As such, the server opcode library 220 contains a list of all the operation codes for each available server function that can be executed by the software module server 60 on behalf of the handset 20, 30. In the preferred embodiment, the number of available server functions can well exceed the number of available handset functions because the software module server 60 does not suffer from the minimal resources typically found on mobile devices such as, for example, cell phones and PDAs.

Runtime engine 230 is preferably configured to process dynamic instructions sets. One example of a dynamic instruction set is a set of instructions to install a software module. The processing of dynamic instruction sets includes translation of opcodes into executable instruction sets and execution of those instruction sets. For example, a set of handset opcodes may be received from the software module server 60 along with a data payload. The opcodes are then translated into executable instructions for the handset. The processing of dynamic instruction sets also includes compilation of opcodes and corresponding data payloads for delivery to the software module server 60. Preferably, runtime engine 230 can be launched by wireless communication device 20, 30 on an as needed basis so that it runs only when necessary and consumes a minimal amount of system resources (e.g. memory, CPU cycles, etc.) on the handset 20, 30.

Figure 3B:
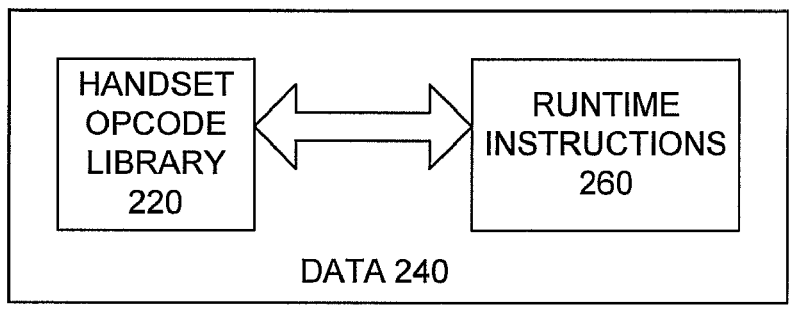
FIG. 3B is a block diagram illustrating an example operation code library and corresponding runtime instruction set.

FIG. 3B is a block diagram illustrating an example operation code library and corresponding runtime instruction set 260. The handset opcode library 220 and runtime instruction set 260 are preferably housed in the data storage area 240 of the handset 20, 30. In one embodiment, the executable instructions in the runtime instruction set 260 correspond in a one-to-one relationship with the opcodes contained in the handset opcode library 220. Alternatively, a single opcode in the handset opcode library 220 may correspond to a sequence of many executable instructions in the runtime instructions 260.

Figure 3C:
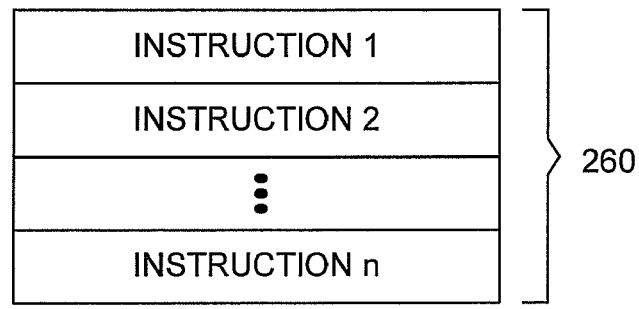
FIG. 3C is a block diagram illustrating an example set of runtime instructions.

FIG. 3C is a block diagram illustrating an example set of runtime instructions 260. In the illustrated embodiment, any number of executable instructions can be included in runtime instructions 260, from instruction 1 through instruction n. Optimally, a large number of functions are available in runtime instructions 260 and yet consume very little resources (e.g. persistent memory) of the handset 20, 30.

Figure 4:
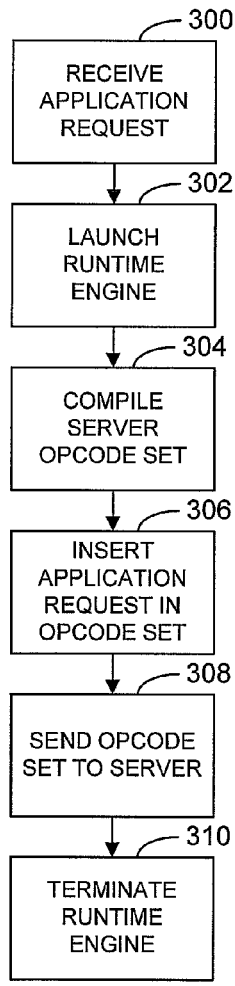
FIG. 4 is a flow diagram illustrating an example process for a user initiated software module download.

FIG. 4 is a flow diagram illustrating an example process for a user initiated software module download. Initially, in step 300 the handset receives the application request from the user. The request may be received, for example, by the modular software interface 200. Next, in step 302 the runtime engine is launched. Once the runtime engine is running, the engine can compile a set of server opcodes according to the action that needs to be taken, as shown in step 304. In this case, the set of server opcodes to be compiled is preferably for downloading the requested software application or module. The set of server opcodes may be obtained from a background process running on the wireless device. Alternatively, the server opcode set may be obtained from a process running on the wireless device under the direction of a user. The compiled set of server opcodes preferably causes the server to reply with the requested software module, as previously described.

For example, the wireless device receives an instruction from a user to download an extension module to the phone book application so that a total of 500 contacts can be maintained rather than the previous 100 contacts. The user provides the name or identification of the new software module to be downloaded. A server opcode set is then compiled that instructs the modular software server to provide the handset with the appropriate software module so that the handset may increase the total number of contacts. In such a case, the result is a server opcode set generated by the runtime engine, as shown in step 304.

Once the server opcode set has been generated, the runtime engine includes the name or identification information in the data payload that will be delivered with the server opcode set. For example, the runtime engine may fetch the application or software module data from persistent or volatile memory, or execute an instruction that returns the data needed, for example through the modular software interface 200. Once the data has been obtained, the run time engine 230 next inserts the data into the server opcode set, as illustrated in step 306. One simple way to achieve this is to append the data payload to the server opcode set in a single data packet.

Once the data payload has been combined with the server opcode set, then the runtime engine sends the server opcode set with the corresponding data payload to the server, as shown in step 308. After the server opcode set and data payload has been sent, the runtime engine may be terminated to free up resources on the wireless device, as illustrated in step 310.

Figure 5:
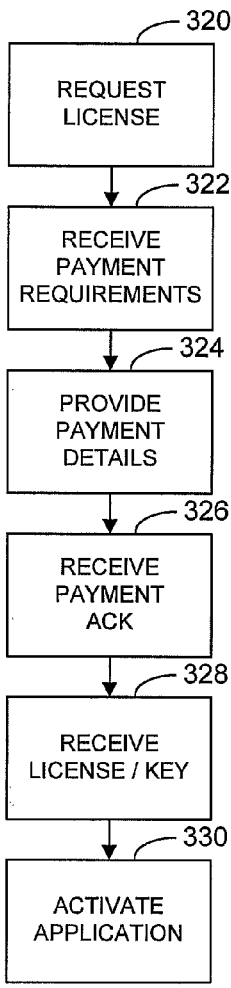
FIG. 5 is a flow diagram illustrating an example process for activating a resident software module on a wireless communication device.

FIG. 5 is a flow diagram illustrating an example process for activating a resident software module on a wireless communication device. The process shown in FIG. 5 may be carried out through the use of opcode sets or through the use of some other wireless data communication means. Initially, in step 320, the handset requests a license from a network license server. The software license manager 205, illustrated in FIG. 3A, preferably initiates this step. The network license server can be the same server as the software module server 60 or it may be a different and separate server. Once the request has been sent, the handset 20, 30 next receives payment requirements from the network license server as shown in step 322. In response, the handset provides payment details to the network license server, as illustrated in step 324.

In one embodiment, the handset may be configured to provide payment details automatically. Alternatively, the handset may be configured to request this information from the user to ensure that the user is willing to pay for the requested license. After sending the payment details, in step 326 the handset receives an acknowledgement of the license server's receipt of the payment details. In one embodiment, this acknowledgement may also serve as a confirmation that the payment has been processed.

Once the acknowledgement has been received, in step 328 the handset next receives a license or activation key from the license server. Preferably, the activation key is configured to allow use of the application on the handset. Once the key has been received, then the application can be activated as illustrated in step 330.

Figure 6:
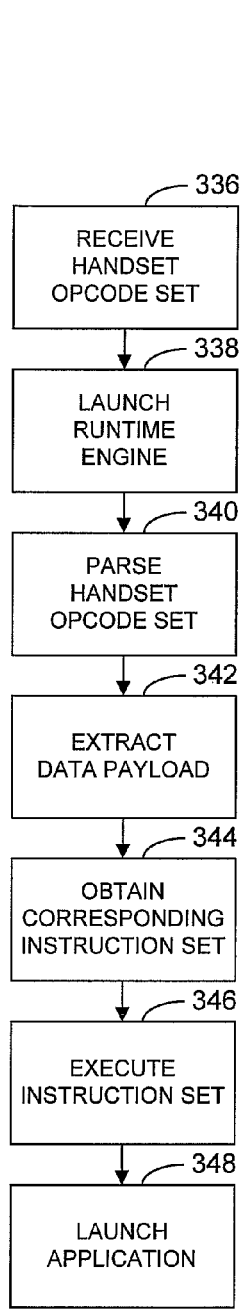
FIG. 6 is a flow diagram illustrating an example process for a network initiated software module download.

FIG. 6 is a flow diagram illustrating an example process for a network initiated software module download. Initially, in step 336, the wireless device receives a set of handset opcodes. The set of handset opcodes can be received via an over-the-air communication link, for example a link with a wireless communication network. Preferably, the opcodes are optimized to minimize the amount of data sent over-the-air. Additionally, a data payload can be included with the set of opcodes received by the handset. In the illustrated embodiment, the handset opcode set is received from a network software module server 60.

In step 338, the wireless device launches its runtime engine to process the handset opcode set. Alternatively, the handset may first authenticate the network server sending the handset opcode set. As illustrated in step 340, the runtime engine parses the handset opcode set and then extracts the data payload in step 342. If no data payload exists, then this step can be skipped, however, the network software module server 60 may include the executable software application in the initial transmission. Alternatively, the handset opcode set may instruct the handset to request the software module from the server. If a data payload does exist, then the resulting data can be stored in an available portion of volatile memory for later use.

Next, in step 344, the runtime engine obtains the executable instructions that correspond to the opcodes in the handset opcode set. These instructions can be obtained from the remote runtime instructions set stored in persistent storage on the data storage area of the handset.

Once the executable instructions corresponding to the opcodes in the handset opcode set have been obtained, the runtime engine executes the instructions, as illustrated in step 346. When the instructions are being executed, any necessary data to be operated on (or installed) can be obtained from volatile memory where the data payload is stored. Alternatively, or additionally, any necessary data to be operated on may be obtained as the result of an executed instruction.

For example, the data payload may comprise the software application that the network has requested the handset to install. Additionally, one or more of the opcodes in the handset opcode set preferably correspond to one or more executable instructions for storing the data payload in persistent memory on the handset. In this example, once the data payload comprising the software module is stored in persistent memory, the handset may thereafter allow the application to be used by a user, or alternatively by a remote network command. Alternatively, the data payload may replace a portion of persistent memory that contains an outdated software application or module or one selected for deletion in order to make room for the new software module. Thus, the handset opcode set and data payload operate on the wireless device to install new software modules for the handset. Additional opcodes and instructions may also be employed to configure the new module or application once it has been installed, if necessary.

Once the instruction set has been executed in its entirety by the runtime engine, the runtime engine can be terminated, and then the application may be executed, as shown in step 348. A particularly illustrative example will explain how the network initiated download may be employed. If a handset is in a vehicle that has been lost or stolen, the handset may be contacted by the network and instructed to download a GPS module (assuming the handset has GPS capable hardware). Once the GPS module is downloaded and installed, the GPS module may begin reporting location information to the network, which in turn may be provide to the owner of the vehicle or the authorities to facilitate tracking of the vehicle. Advantageously, this may all be accomplished without the knowledge of the people in proximity to the handset.

Figure 7:
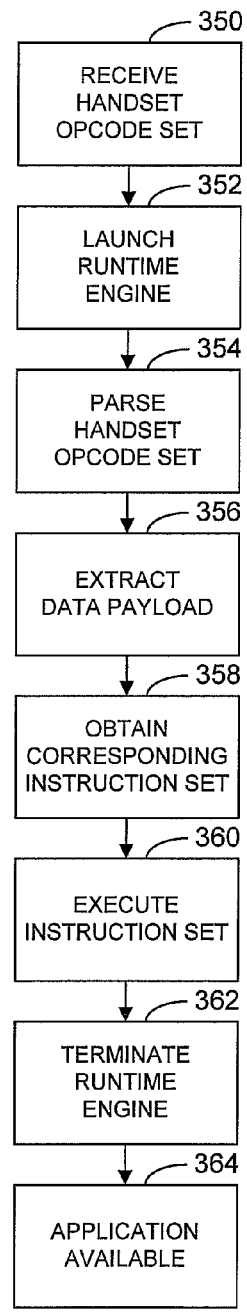
FIG. 7 is flow diagram illustrating an example process for installing a software module on a wireless communication device.

FIG. 7 is flow diagram illustrating an example process for installing a software module on a wireless communication device. Initially, in step 350, the wireless device receives a set of handset opcodes. The set of handset opcodes can be received via an over-the-air communication link, for example a link with a wireless communication network. Preferably, the opcodes are optimized to minimize the amount of data sent over-the-air. Additionally, a data payload can be included with the set of opcodes received by the handset. In the illustrated embodiment, the handset opcode set is received from a network software module server.

In step 352, the wireless device launches its runtime engine to process the handset opcode set. Alternatively, the handset may first authenticate the network server sending the handset opcode set. As illustrated in step 354, the runtime engine parses the handset opcode set and then extracts the data payload in step 356. If no data payload exists, then this step can be skipped, however, the network software module server may include the executable software application in the initial transmission. Alternatively, the handset opcode set may instruct the handset to request the software module from the server. If a data payload does exist, then the resulting data can be stored in an available portion of volatile memory for later use.

Next, in step 358, the runtime engine obtains the executable instructions that correspond to the opcodes in the handset opcode set. These instructions can be obtained from the remote runtime instructions set stored in persistent storage on the data storage area of the handset. Once the executable instructions corresponding to the opcodes in the handset opcode set have been obtained, the runtime engine executes the instructions, as illustrated in step 360. When the instructions are being executed, any necessary data to be operated on (or installed) can be obtained from volatile memory where the data payload is stored. Alternatively, or additionally, any necessary data to be operated on may be obtained as the result of an executed instruction. Once the instruction set has been executed in its entirety by the runtime engine, in step 362 the runtime engine can be terminated, and then the application is available for use, as shown in step 364.

Figure 8:
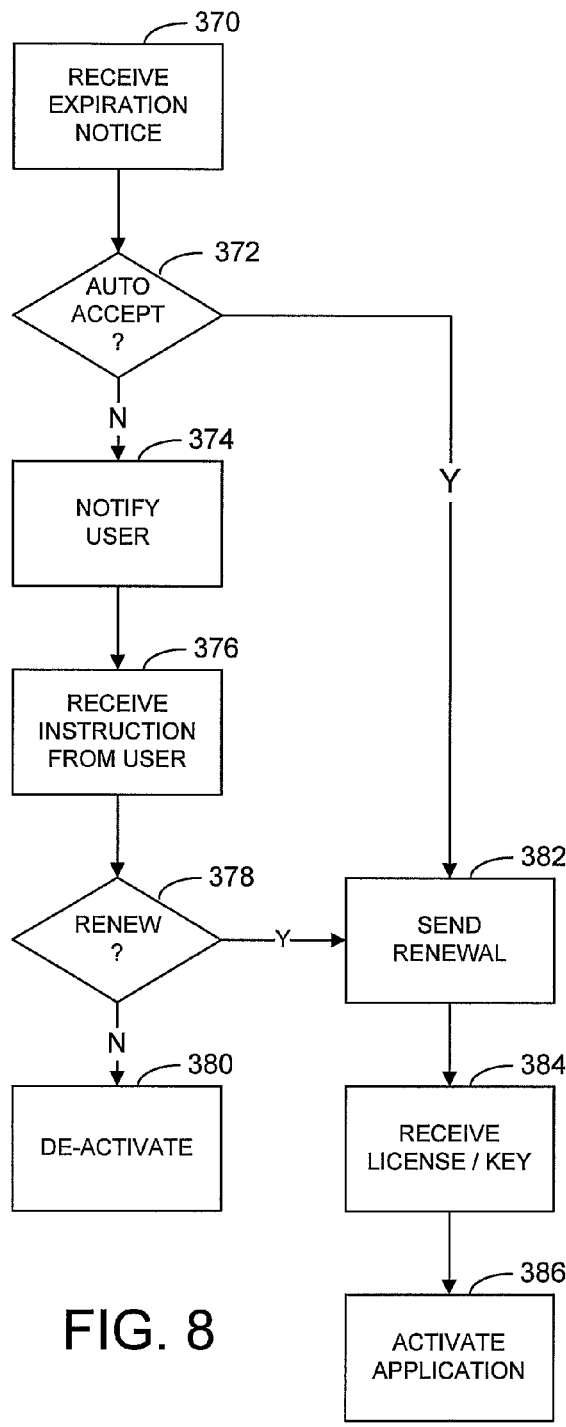
FIG. 8 is flow diagram illustrating an example process for expiring a software module on a wireless communication device.

FIG. 8 is flow diagram illustrating an example process for expiring a software module on a wireless communication device. Initially, in step 370, the handset receives an expiration notice. The expiration notice can be received via a wireless communication network and originate from a licensing server communicatively coupled with the handset via the network. In one embodiment, the expiration notice may be linked to a trial period for the software module or may be linked to an annual license fee for the module.

Once the expiration notice is received by the handset, the handset determines in step 372 whether it has been instructed to automatically renew the license or make an initial payment for the module. If the handset determines that it is not authorized or has not been instructed to automatically renew or pay, then in step 374 the handset notifies the user of the expiration notice for the software module.

The notification can be made by presenting a message on the display of the handset or by generating a text message that is stored in memory on the handset for later review. The notification may also be visual such as a message on the display or a blinking light or it may also be audio such as a prerecorded message or tone. Alternatively, the blinking light or audio tone (or vibration of the handset) may indicate that a message is available for the user and the message may provide the detail of the expiration notice. Additionally, the handset may also send a message to the network (or the network may initiate the process) such that a pre-recorded voice message is left in the user's voice mail box that informs the user of the expiration notice. A variety of other notification methods may also be employed, as will be understood by those having skill in the art.

Once the user has been informed of the expiration notice, the handset receives an instruction from the user in step 376. This instruction is examined by the handset in step 378 to determine if the license should be renewed (or if the initial payment should be made). If the instruction from the user is to not renew (or pay), then in step 380 the handset deactivates the software module. In one embodiment, the handset may wait until the end of the license period or evaluation period before deactivation. Additionally, if no instruction is received from the user as determined by step 378, the lack of an instruction can be interpreted as a negative response and the software module deactivated in step 380.

If the handset, in step 378 determines that the instruction from the user is to renew or pay, then the handset sends a renewal instruction (or initial payment instruction) to the network or license server, as illustrated in step 382. Additionally, if, in step 372 the handset determines that it is authorized to automatically renew or pay, then the handset also sends the appropriate instruction in step 382. On the receiving end of the renewal instruction (e.g., the license server), the payment may be effected by a credit card charge or the addition of a line item on the customer's bill for the handset service.

In response to the instruction to pay or renew, the handset may receive a license or a key that can be employed to instruct the software to continue operation or to allow additional functionality, as shown in step 384. In step 386, the application is activated with the license or key so that the user may thereafter use the software module or application for the new license period.

Figure 9:
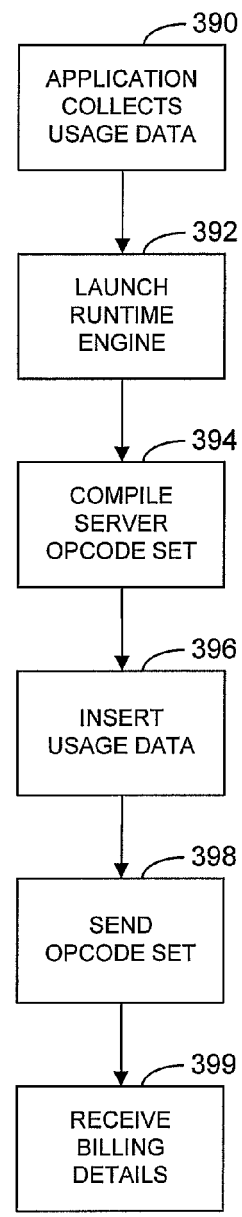
FIG. 9 is flow diagram illustrating an example process for paying for using a software module on a wireless communication device.

FIG. 9 is flow diagram illustrating an example process for paying for using a software module on a wireless communication device. Initially, in step 390, an application may collect usage data for the application itself or for other applications on the handset. This data can preferably be stored in persistent memory on the handset. Next, in step 392 the runtime engine is launched. Once the runtime engine is running, the engine can compile a set of server opcodes, as shown in step 394. The compiled set of server opcodes preferably causes the server to process the usage data contained in the corresponding data payload, which is inserted into the opcode set (or appended to the opcode set) in step 396.

Once the data payload has been combined with the server opcode set, then the runtime engine sends the server opcode set with the corresponding data payload to the server, as shown in step 398. After the server opcode set and data payload has been sent, the handset preferably receives billing details from the server, as shown in step 399. Preferably, the billing details relate to the usage data provided with the server opcode set. Finally, the runtime engine may be terminated to free up resources on the wireless device.

Figure 10:
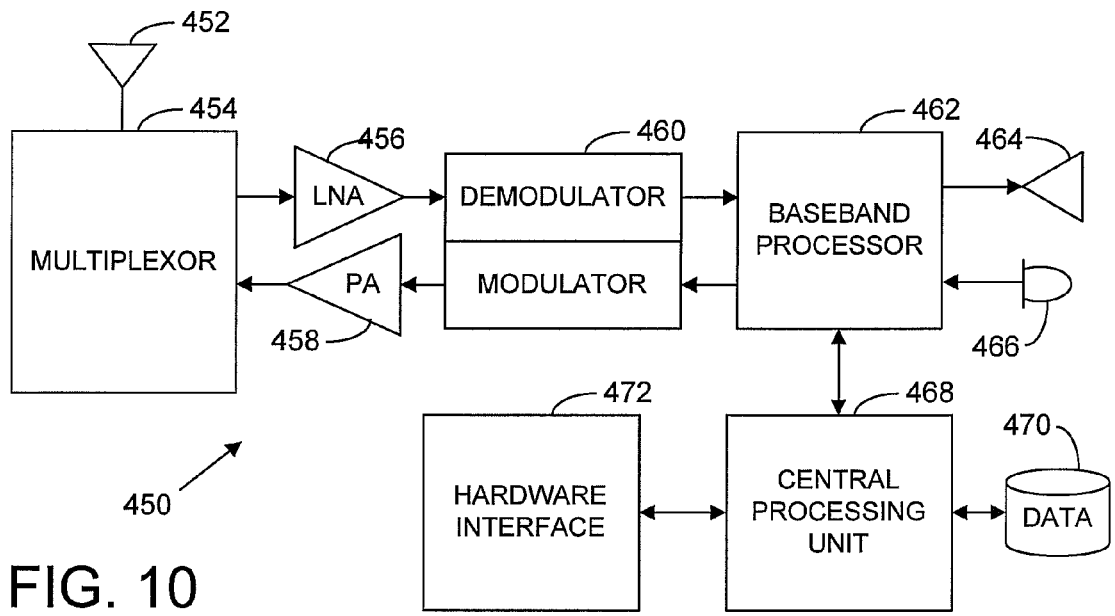
FIG. 10 is a block diagram illustrating an exemplary wireless communication device that may be used in connection with the various embodiments described herein.

FIG. 10 is a block diagram illustrating an exemplary wireless communication device 450 that may be used in connection with the various embodiments described herein. For example, the wireless communication device 450 may be used in conjunction with a handset or PDA network device or as a part of a sensor node in a wireless mesh network. However, other wireless communication devices and/or architectures may also be used, as will be clear to those skilled in the art.

In the illustrated embodiment, wireless communication device 450 comprises an antenna 452, a multiplexor 454, a low noise amplifier ("LNA") 456, a power amplifier ("PA") 458, a modulation circuit 460, a baseband processor 462, a speaker 464, a microphone 466, a central processing unit ("CPU") 468, a data storage area 470, and a hardware interface 472. In the wireless communication device 450, radio frequency ("RF") signals are transmitted and received by antenna 452. Multiplexor 454 acts as a switch, coupling antenna 452 between the transmit and receive signal paths. In the receive path, received RF signals are coupled from a multiplexor 454 to LNA 456. LNA 456 amplifies the received RF signal and couples the amplified signal to a demodulation portion of the modulation circuit 460.

Typically modulation circuit 460 will combine a demodulator and modulator in one integrated circuit ("IC"). The demodulator and modulator can also be separate components. The demodulator strips away the RF carrier signal leaving a base-band receive signal, which is sent from the demodulator output to the base-band processor 462.

If the base-band receive audio signal contains audio information, then base-band processor 462 decodes the signal and converts it to an analog signal. Then the signal is amplified and sent to the speaker 464. The base-band processor 462 also receives analog audio signals from the microphone 466. These analog audio signals are converted to digital signals and encoded by the base-band processor 462. The base-band processor 462 also codes the digital signals for transmission and generates a base-band transmit audio signal that is routed to the modulator portion of modulation circuit 460. The modulator mixes the base-band transmit audio signal with an RF carrier signal generating an RF transmit signal that is routed to the power amplifier 458. The power amplifier 458 amplifies the RF transmit signal and routes it to the multiplexor 454 where the signal is switched to the antenna port for transmission by antenna 452.

The baseband processor 462 is also communicatively coupled with the central processing unit 468. The central processing unit 468 has access to a data storage area 470. The central processing unit 468 is preferably configured to execute instructions (i.e., computer programs or software) that can be stored in the data storage area 470. Computer programs can also be received from the baseband processor 462 and stored in the data storage area 470 or executed upon receipt. Such computer programs, when executed, enable the wireless communication device 450 to perform the various functions of the present invention as previously described.

In this description, the term "computer readable medium" is used to refer to any media used to provide executable instructions (e.g., software and computer programs) to the wireless communication device 450 for execution by the central processing unit 468. Examples of these media include the data storage area 470, microphone 466 (via the baseband processor 462), antenna 452 (also via the baseband processor 462), and hardware interface 472. These computer readable mediums are means for providing executable code, programming instructions, and software to the wireless communication device 450. The executable code, programming instructions, and software, when executed by the central processing unit 468, preferably cause the central processing unit 468 to perform the inventive features and functions previously described herein.

The central processing unit is also preferably configured to receive notifications from the hardware interface 472 when new devices are detected by the hardware interface. Hardware interface 472 can be a combination electromechanical detector with controlling software that communicates with the CPU 468 and interacts with new devices.

Figure 11:
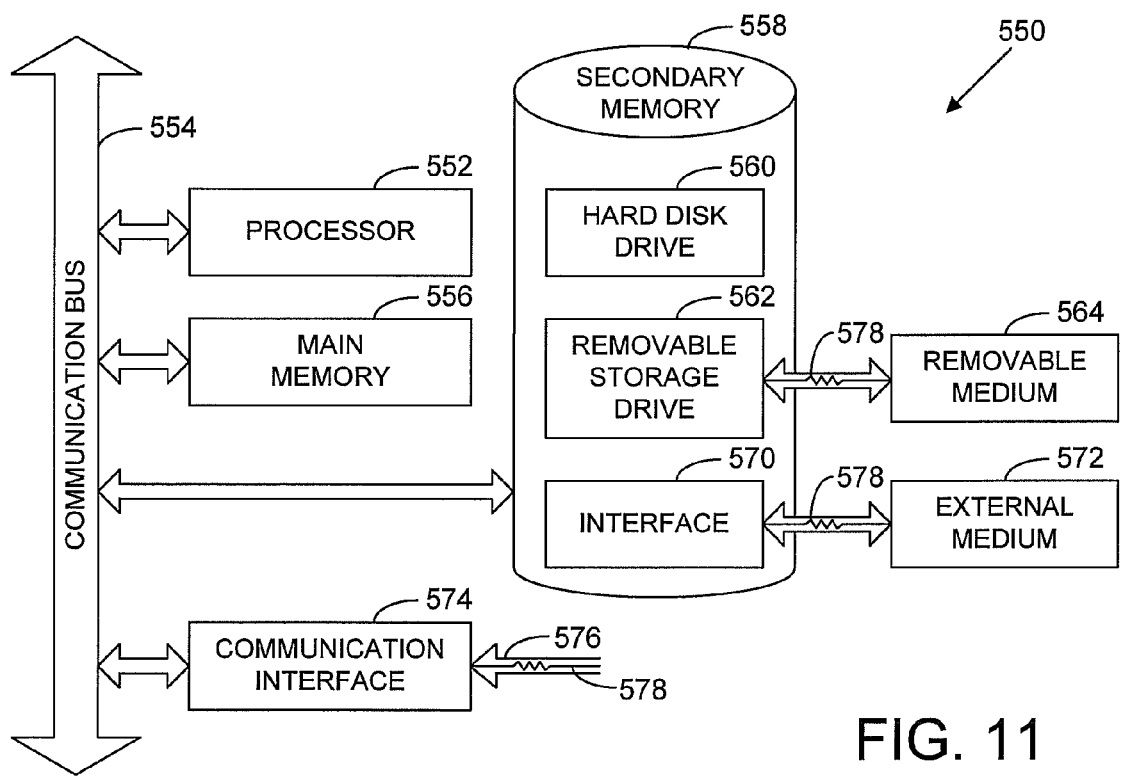
FIG. 11 is a block diagram illustrating an exemplary computer system as may be used in connection with various embodiments described herein.

FIG. 11 is a block diagram illustrating an exemplary computer system 550 that may be used in connection with the various embodiments described herein. For example, the computer system 550 may be used in conjunction with a remote server configured to process server opcode sets and create and send handset opcode sets. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

While the particular modular software components for wireless communication devices herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for expiring a software module on a wireless communication device, comprising:
   receiving, at the wireless communication device, an expiration notice for the software module;
   determining if license renewal of the software module is automatic; and
   if the license renewal is not automatic, then:
      notifying a user of the wireless communication device of the receipt of the expiration notice, and
      de-activating the software module upon receipt of instructions to not renew, and
   if the license renewal is automatic or upon receipt of instructions to renew, then:
      sending the renewal instructions to a software module server, receiving an activation key from the software module server, and activating the software module utilizing the activation key.

2. The method of claim 1 further comprising de-activating the software module if no instructions are received from the user in response to the notifying step.

3. The method of claim 1 further comprising de-activating the software module after an expiration of a trial period if no instructions are received from the user in response to the notifying step.

4. The method of claim 1 wherein the activation key is a renewed license.

5. A wireless communication device comprising:
   a display;
   a processor coupled to the display;
   memory coupled to the processor; and
   instructions stored on the memory, the instructions to perform the following when executed by the processor:
      receiving an expiration notice for the software module,
      determining if license renewal of the software module is automatic, and
      if the license renewal is not automatic, then:
         notifying a user of the wireless communication device of the receipt of the expiration notice, and
         de-activating the software module upon receipt of instructions to not renew, and
      if the license renewal is automatic or upon receipt of instructions to renew, then:
         sending the renewal instructions to a software module server,
         receiving an activation key from the software module server, and
         activating the software module utilizing the activation key.

6. The device of claim 5, wherein the instructions are to further perform the following when executed by the processor:
   de-activating the software module if no instructions are received from the user in response to the notifying step.

7. The device of claim 5, wherein the instructions are to further perform the following when executed by the processor:
   de-activating the software module after an expiration of a trial period if no instructions are received from the user in response to the notifying step.

8. The device of claim 5, wherein the activation key is a renewed license.

* * * * *